United States Patent
Janecka (10) Patent No.: US 10,925,436 B2
(45) Date of Patent: *Feb. 23, 2021

(54) ROLLER CONVEYOR OVEN FOR HEATING WHILE ROTATING AND CONVEYING A MULTIPLICITY OF CYLINDRICAL FOOD ITEMS THEREON

(71) Applicant: J & B Sausage Company, Inc., Waelder, TX (US)

(72) Inventor: Danny Janecka, Waelder, TX (US)

(73) Assignee: J&B Sausage Company, Inc., Waelder, TX (US)

( * ) Notice: Subject to any disclaimer, the term of this patent is extended or adjusted under 35 U.S.C. 154(b) by 420 days.

This patent is subject to a terminal disclaimer.

(21) Appl. No.: 15/643,131

(22) Filed: Jul. 6, 2017

(65) Prior Publication Data
US 2017/0332837 A1    Nov. 23, 2017

Related U.S. Application Data (63) Continuation of application No. 14/563,422, filed on Dec. 8, 2014, now Pat. No. 9,723,952.

(60) Provisional application No. 61/969,494, filed on Mar. 24, 2014, provisional application No. 61/912,871, filed on Dec. 6, 2013.

(51) Int. Cl.
*A47J 37/04* (2006.01)
*B65G 17/24* (2006.01)

(52) U.S. Cl.
CPC ........... *A47J 37/048* (2013.01); *A47J 37/044* (2013.01); *A47J 37/045* (2013.01); *B65G 17/24* (2013.01); *B65G 2201/0202* (2013.01)

(58) Field of Classification Search
CPC ...... A47J 37/048; A47J 37/044; A47J 37/043; A47J 37/041; A47J 37/045; B65G 17/24; B65G 2201/0202
USPC ...... 99/441, 427, 474, 475, 476, 477, 443 C
See application file for complete search history.

(56) References Cited

U.S. PATENT DOCUMENTS

| | | | |
|---|---|---|---|
| 4,364,309 | A | 12/1982 | Gorbatov et al. |
| 4,660,254 | A | 4/1987 | Kollross |
| 5,211,106 | A | 5/1993 | Lucke |
| 6,054,155 | A | 4/2000 | Kobussen et al. |
| 6,386,095 | B1 | 5/2002 | Ausaf |
| 6,615,707 | B1 | 9/2003 | Zittel et al. |
| 7,357,953 | B1 | 4/2008 | Van Den Dungen et al. |

(Continued)

FOREIGN PATENT DOCUMENTS

| | | |
|---|---|---|
| DE | 3420764 | 12/1985 |
| EP | 0580232 | 1/1994 |

*Primary Examiner* — Reginald Alexander
(74) *Attorney, Agent, or Firm* — Jackson Walker LLP (57) ABSTRACT

A forced hot air roller conveyor drying assembly is provided. It consists primarily of two parts; a roller conveyor for rolling cylindrical elongated food members while transporting them horizontally from one end of the conveyor to the other, and a hot air drying assembly for blowing hot air around the product as it is being rolled. The combined rolling of the product and the drying of the product helps ensure that the physical roundness of the food product remains nice and uniform while it is being uniformly dried. The forced hot air assembly may include a fan and heating elements, the fan directing warm air to the product rolling horizontally through the assembly and the roller conveyor may be comprised of a multiplicity of paired roller members driven by chain links, which chains are in turn driven by an axle engaging a drive sprocket.

10 Claims, 6 Drawing Sheets

(56) References Cited

U.S. PATENT DOCUMENTS

2011/0014323 A1   1/2011  Heinz et al.
2012/0207879 A1   8/2012  Leising
2012/0308316 A1  12/2012  Stousland et al.

ROLLER CONVEYOR OVEN FOR HEATING WHILE ROTATING AND CONVEYING A MULTIPLICITY OF CYLINDRICAL FOOD ITEMS THEREON

RELATED APPLICATIONS

This continuation application claims the benefit of and priority to U.S. application Ser. No. 14/563,422, filed Dec. 8, 2014, which claims priority to U.S. Provisional Application No. 61/912,871, filed Dec. 6, 2013, and No. 61/969,494, filed Mar. 24, 2014. These prior applications are herein incorporated by reference in their entirety.

FIELD OF THE INVENTION

Roller conveyors for food items, including air handling for heating the food items.

BACKGROUND OF THE INVENTION

Conveyors for moving food items, such as sausages and hot dogs as known in the art. However, they typically do not have the structure and features as more specifically set forth in the embodiments of Applicant's conveyor roller (with, optionally, an air handling unit) as set forth in more detail below.

SUMMARY OF THE INVENTION

A device for conveying a multiplicity of cylindrical food items having a length and a diameter. The device comprises an elongated rectangular frame having multiple cross-members. The cross-members engage an inner pair and an outer pair of longitudinal members spaced apart from one another by the multiple cross-members and trending generally perpendicular thereto, the frame has a length and width. A roller conveyor assembly comprising multiple rotatable roller members and a pair of link chains. The pair of chains include a first link chain and a second link chain, the link chains having multiple links, at least some of the links being laterally spaced apart and having a first pair of platforms engaged therewith. The first link chain rides on one of the inner pair of longitudinal members, the second link chain rides on the second of the inner pair of longitudinal members, such that the platforms of the first pair of platforms are spaced perpendicular across from one another, and adjacent a second pair of platforms likewise configured. The platforms of the first pair and the second pair each pivotably hold a pair of the rotatable roller members, each one of the pair with a drive end comprising a gear and supported by one of the platforms of the pair and a removed end for support on the other platform of the pair. A motor drives an axle which has a pair of drive sprockets and engages the frame. A pair of toothed racks include a first toothed rack and a second toothed rack, the racks supported by the frame. The racks lay adjacent the platforms, such that the gears of the drive ends are engaged with the teeth of the racks such that when the roller members move past the frame it causes the rollers to rotate. The device further comprises: a forced hot air assembly including a housing for substantially enclosing the roller conveyor assembly and for directing hot air onto the rotatable roller members. The forced hot air assembly includes a hot air handling assembly having a manifold with multiple jets. The forced hot air assembly may include an air inlet for carrying forced hot air into the housing and an exhaust for carrying hot air from the housing. The inlet or exhaust has a member to control the amount of air moving therethrough, further including a fan and burner for heating air for introduction into the housing.

DETAILED DESCRIPTION OF THE PREFERRED EMBODIMENT

Figure 1:
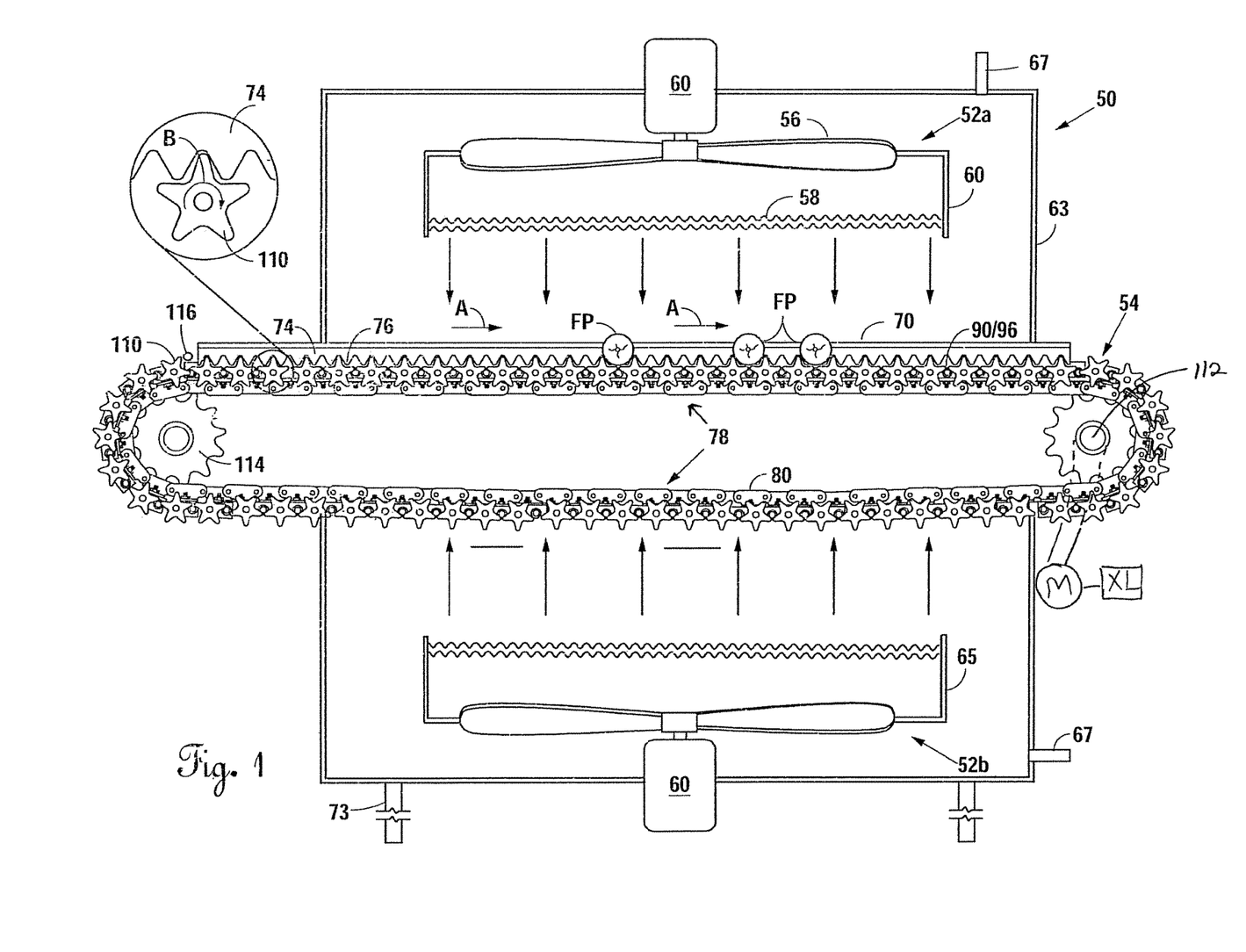
FIGS. 1, and 1A-1F are various views of a novel drying and transport assembly for use with Applicant's method.
Figure 1A:
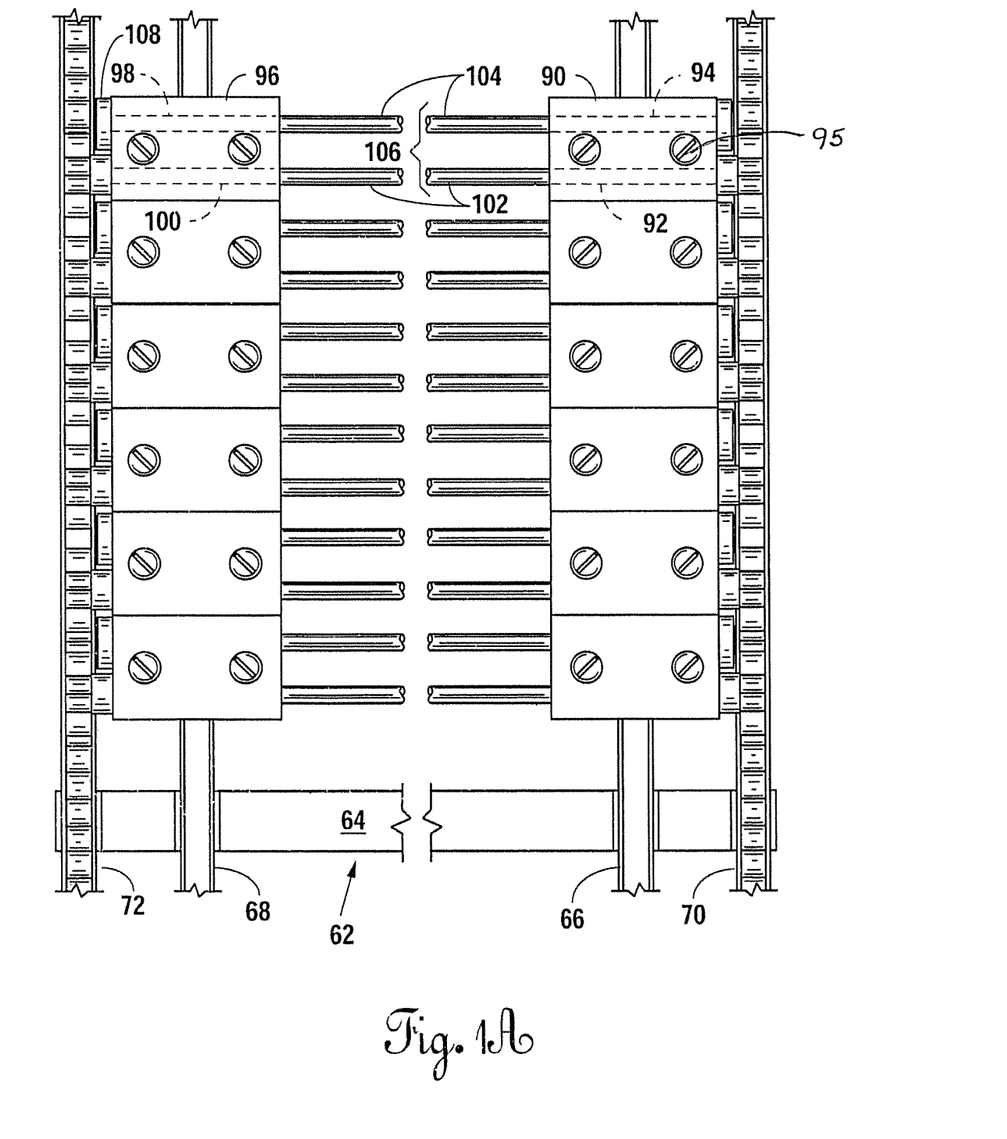
Figure 1B:
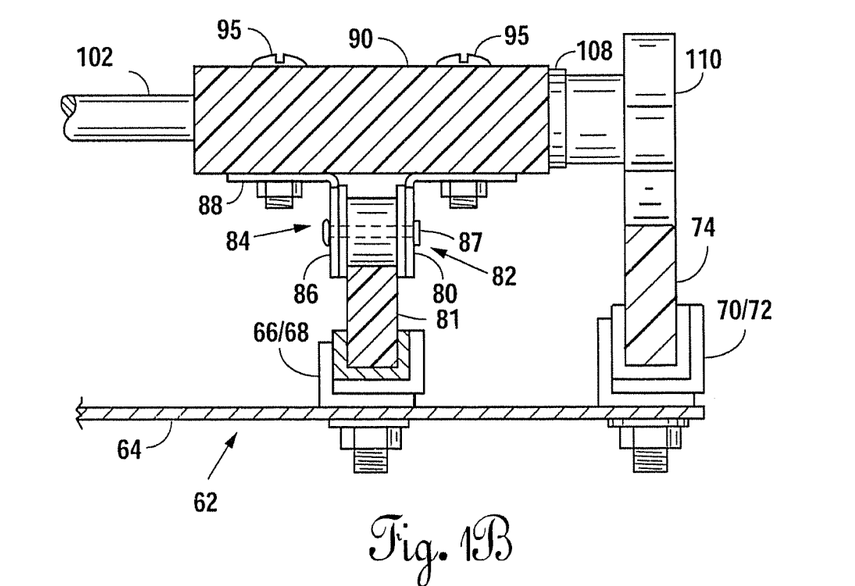
Figure 1C:
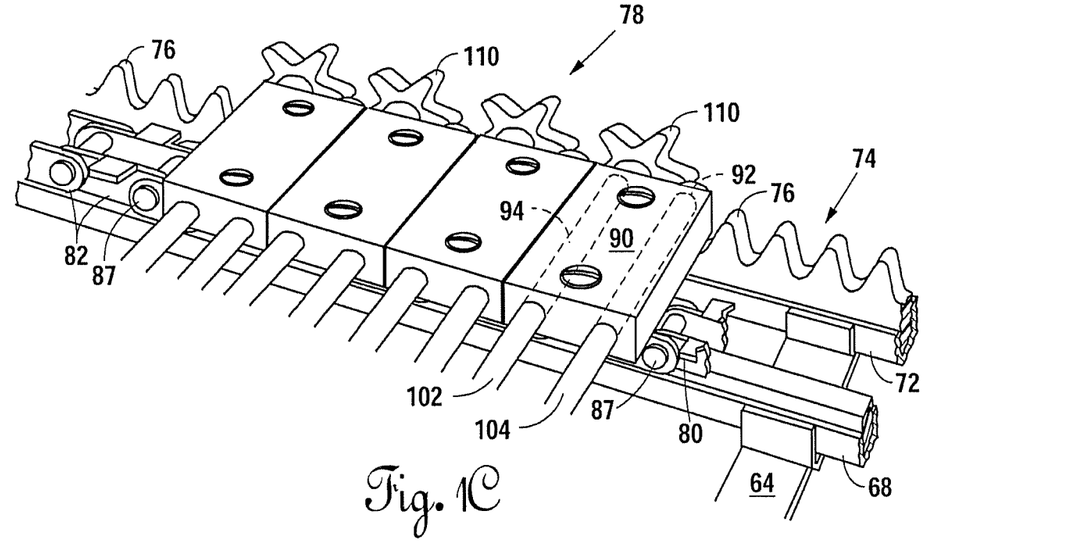
Figure 1D:
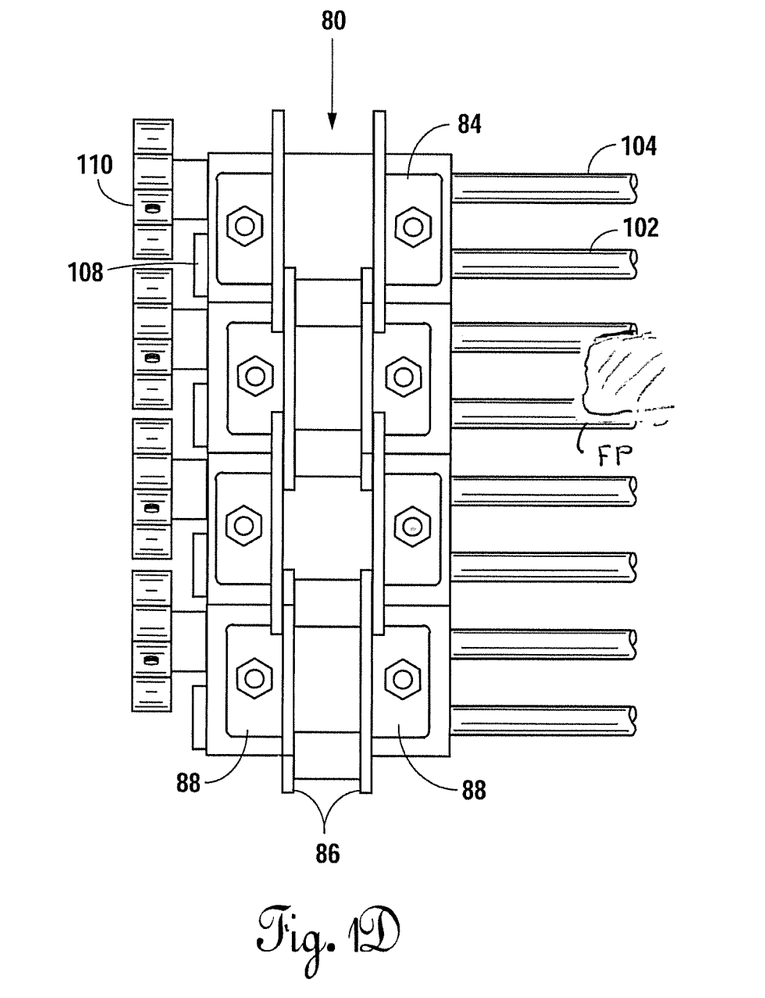
Figure 1E:
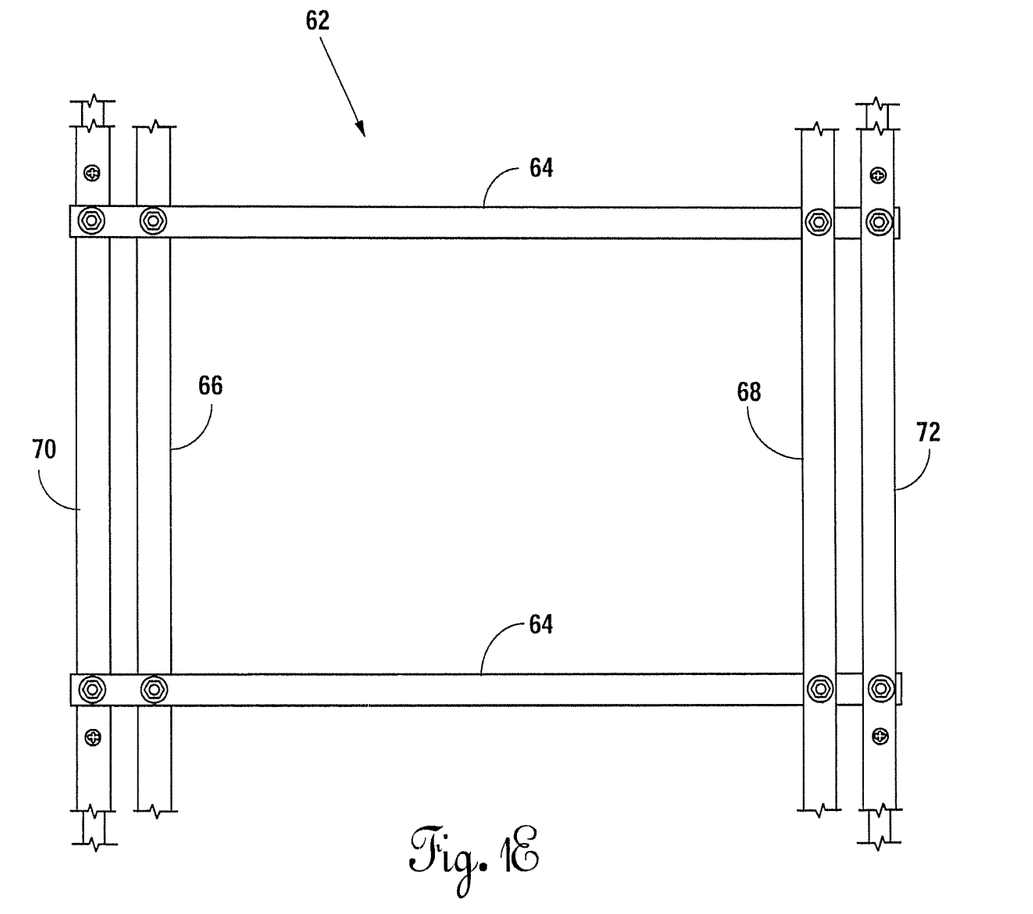
Figure 1F:
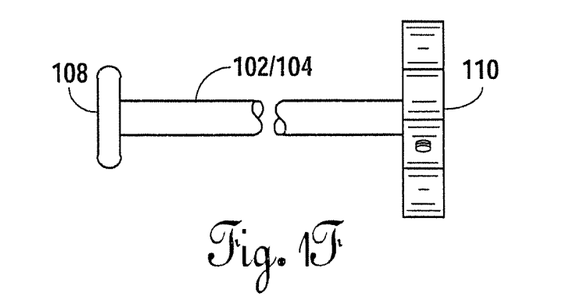

FIGS. 1-1F disclose details of an embodiment drying and transport assembly 50 for use transporting multiple food items while heating them. Drying and product transport assembly 50 may include one or more air handling units 52a/52b designed to move air about the product as the product is being transported. Air handling units 52a/52b each may include a fan assembly 56, including a motor 60, a heating element 58, and a shroud 65 to direct forced hot air to the food products on a roller/conveyor assembly 54 and for engaging the fan and the heating element. Heating element 58 heats moving air, which fan assembly 56 and shroud direct to the food product. There may be a unit above and below the rollers as seen in FIG. 1 to help ensure even heating and both fan and heat controls (not shown) may be used to control air flow and hot air temperatures.

The food product, such as sausage links or frankfurters, is carried on a food product roller/conveyor assembly 54, which may include a frame 62. A housing 63 (with air inlet 67) may engage, or at least partly enclose) both the air handling units 52a/52b and at least partly enclose assembly 54. Legs 73 may engage frame 62 and/or housing 63 to support drying and product transport assembly 50. Frame 62 is designed to be stationary and acts to hold other elements of the food product roller/conveyor assembly 54 in spaced relation. Frame 62 may include multiple transverse members 64, the multiple transverse members engaging inner longitudinal members 66/68 and outer longitudinal members 70/72. The inner and outer longitudinal members being paired laterally as seen in FIG. 1A. A rack 74 with upstanding teeth 76 thereon is seen to rest in longitudinal members 70/72 and is directed upward (FIG. 10) or may be suspended above frame 62 and directed downward (see FIG. 1). Rack 74 is positioned such that teeth 76 engage drive sprockets 110 at the end of roller members 102/104.

The roller/conveyor assembly 78 is provided and may include a pair of link chains 80 configured as set forth herein. Link chain 80 may be supported vertically spaced apart above the inner longitudinal members 66/68 in the manner set forth in FIG. 1B by support member 81. The links 82 of link chain 80 may include mounting brackets 84. Mounting brackets 84 may include depending members 86 and horizontal members 88, the two members of one link spaced apart on chain link axles 87 (see FIG. 1B). Horizontal members 88 are adapted to receive laterally spaced apart roller mounting blocks 90/96 through the use of fasteners 95, the paired chain and mounting block assemblies on either side of the frame are as seen in FIG. 1A (chain omitted for clarity).

In FIG. 1A, mounting block 90 is seen to have a first and second 92/94 channels and mounting block 96 is seen to have first and second channels 98/100 therein. The channels are adapted to receive the removed ends of roller members 102/104 (see FIG. 1B), these paired roller members 106 being supported in mounting blocks 90/96, so they may roll therein. As seen in FIG. 1F, at the removed ends of roller members 102/104 are a land 108 on one end to position the removed end against the outer wall of the mounting block and a roller drive sprocket 110 at the opposite end of the land. Roller member drive sprocket 110 will cause rotation of the axle support roller members as they are driven from one end of the frame to the other as seen in FIG. 1. This is due to chains 80 pulling the roller/conveyor assembly 78, which includes moving drive sprockets 110 across rack 74 (see FIG. 1, upper rack; FIG. 1B, lower rack). Arrow A in FIG. 1 shows the longitudinal movement of the cylindrical food product resting between the rollers and Arrow B indicates the rotational direction of the food product. The combined rotation and longitudinal movement helps ensure even drying while maintaining the round physical configuration of the food product. A pair of motor "M" driven drive sprockets 114 are located on either end of a frame 62 mounted drive axle 112, which may be motor driven, as with an electric motor "M" with a speed controller "XL" (see FIG. 1) FIG. 1 shows a setting finger 116, which may be attached to the frame and is provided so that the chain passes by, but the teeth of the roller member sprocket will strike it as the teeth pass by. For example, in FIG. 1, you will see that the chain is moving from left to right, and the roller member drive sprocket 110 moving from left to right is just about to have one of its teeth strike finger 116. When that happens, it will set the roller member drive sprocket in a proper position so it does not jam when it strikes the leading edge of rack 74.

Figure 2:
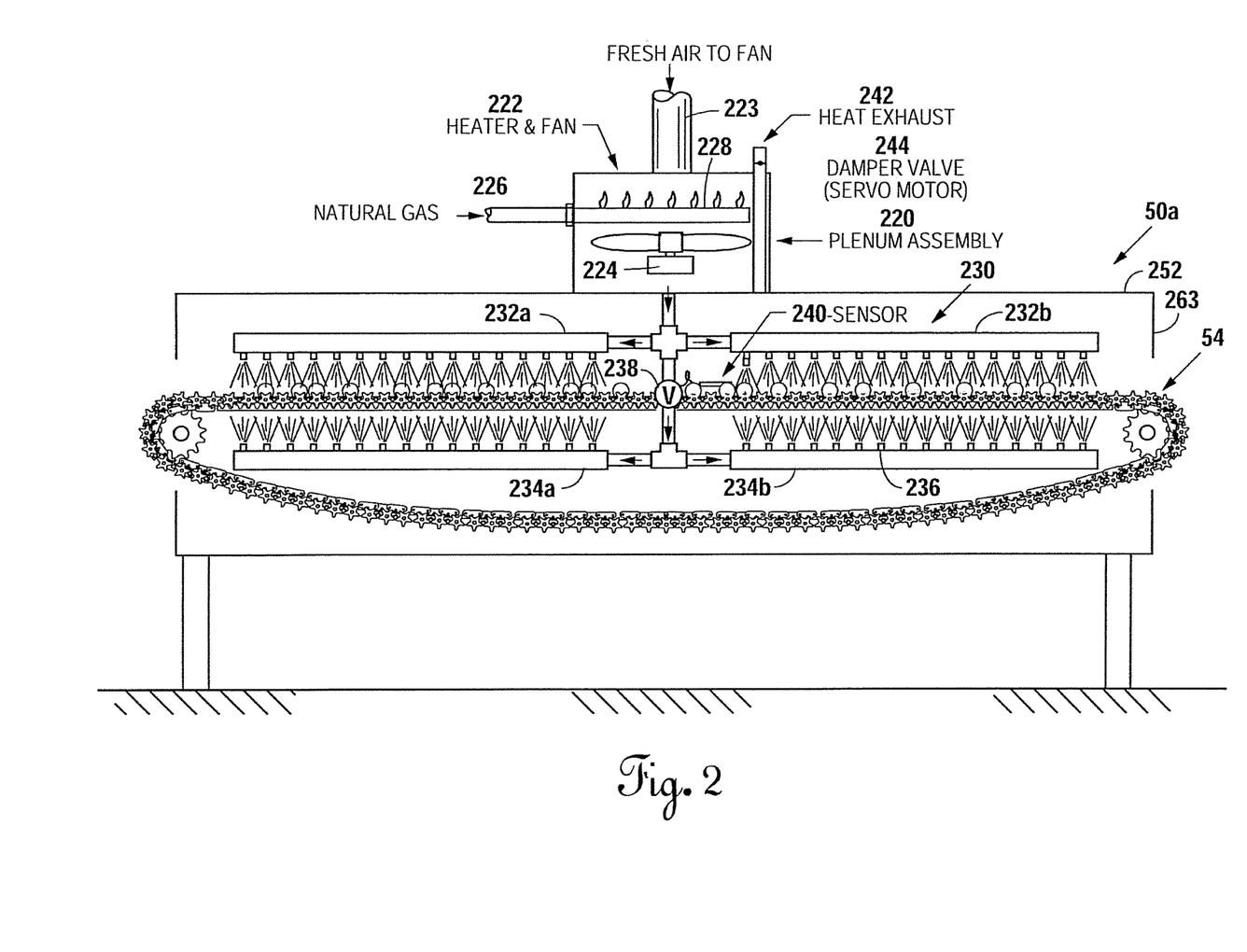
FIG. 2 shows Applicant's alternate preferred embodiment of an air handling unit for use with the roller conveyor.

FIG. 2 illustrates an alternate preferred embodiment of a roller conveyor forced hot drying assembly 50a, which comprises a roller conveyor assembly 54 with an air handling unit 252. The function of the roller assembly is to carry individual links of food product aligned on the rollers through a forced air heater to roll the food product while heating it in a manner that provides uniform and sufficient heat as well as maintains the roundness and the form of the product and, to do so, in the machine that has a low profile. Illustrated is one such assembly 50a in which the air handling unit 252 is designed to provide substantially uniform forced hot air onto the product as it is being moved. Rectangular housing 263 may have openings on either end thereof as seen in FIG. 2. A plenum assembly 220 is provide engaged to housing 263 which plenum assembly may include a heater 222 and fan 224. The fan draws in the air through controlled openings on intake 223 and past a burner 228 (such as an electrical or natural gas burner), which may include a natural gas conduit 226, burner 228 adjacent the fan. Engaged to the plenum assembly 220 may be a hot air distribution system 230, which is a system of pipes that will typically include multiple manifolds 232a/232b/234a/234b (some may be above product, some below) and multiple air jets 236 as laid out in FIG. 2 in one embodiment to provide forced hot air so the hot air jets to the top and bottom of the product as it rolls past the jets. Here, a pair of upper manifolds 232a/232b and lower manifolds 234a/234b are engaged to the plenum to direct the airflow to the jets. Air temperature control by a temperature sensor 240 that may be placed within the interior of housing 263, so to control the air temperature and, therefore, the food product temperature therein by turning the burner up, down or off. Typically, this temperature may be controlled between any suitable temperature range, about 120 and 210° F. or about 195° F., in one embodiment. In addition, a heat exhaust 242 engaged to the interior of housing 263 may be controlled, for example, through a servo-motor controlled damper 244, to control the humidity within the interior of the housing.

The heat may be controlled by turning the gas burner (or electrical heater) on and off or up and down. The humidity may be controlled by adjusting fresh air which typically is dryer than the air inside housing 252. This is done by controlling the damper valve 244, which may have a servo motor and be in one embodiment 50% open, the damper may be within heat exhaust 252. Opening the damper will typically drop humidity by allowing more air to enter through fresh inlet 223, closing the damper will increase humidity (unless it is a very wet or humid day).

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. A device for conveying a multiplicity of cylindrical food items having a length and a diameter, the device comprising:
    an elongated rectangular frame having a pair of longitudinal members spaced apart from one another in a parallel manner;
    a roller conveyor assembly comprising multiple rotatable roller members, a pair of link chains, the pair comprising a first link chain and a second link chain spaced laterally apart from the first link chain, the link chains having multiple links, at least some of the links having a first pair of platforms engaged therewith, the first link chain for riding on one of the pair of longitudinal members, the second link chain for riding on the second of the pair of longitudinal members, such that the platforms of the first pair of platforms are spaced laterally across from one another, and adjacent a second pair of platforms likewise configured;
    wherein the platforms of the first pair and the second pair each pivotably hold a pair of the rotatable roller members, at least one of each pair of rotatable roller members with a drive end comprising a gear and supported by one of the platforms of the pair and a removed end for support on the other platform of the pair; and
    a first toothed rack supported by the frame, the rack for laying adjacent the drive ends, such that the gears of the drive ends are engaged with the teeth of the rack such that when the roller conveyor moves past the frame it causes the rollers having drive ends to rotate.

2. The device of claim 1 further comprising:
    a forced hot air assembly including a housing for substantially enclosing the roller conveyor assembly and for directing hot air onto the rotatable roller members.

3. The device of claim 2:
    wherein the forced hot air assembly includes a hot air handling assembly having a manifold with multiple jets.

4. The device of claim 3:
    wherein the forced hot air assembly includes an air inlet for carrying forced hot air into the housing and an exhaust for carrying hot air from the housing.

5. The device of claim 4:
    wherein either the inlet or exhaust has a member to control the amount of air moving therethrough.

6. The device of claim 5 further including a fan and burner for heating air for introduction into the housing.

7. The device of claim 1, further including an index finger engaging the gears of the rotatable roller members having drive ends.

8. The device of claim 2, further including a motor for driving the axle and sprocket link chains.

9. The device of claim 8, further including a speed controller for controlling the motor.

10. A device for conveying a multiplicity of cylindrical food items having a length and a diameter, the device comprising:
- an elongated rectangular frame having a pair of longitudinal members spaced apart from one another in a parallel manner;
- a roller conveyor assembly comprising multiple rotatable roller members, a pair of link chains, the pair comprising a first link chain and a second link chain spaced laterally apart from the first link chain, the link chains having multiple links, at least some of the links having a first pair of platforms engaged therewith, the first link chain for riding on one of the pair of longitudinal members, the second link chain for riding on the second of the pair of longitudinal members, such that the platform of the first pair of platforms are spaced laterally across from one another, and adjacent a second pair of platforms likewise configured;
  - wherein the platforms of the first pair and the second pair each pivotably hold a pair of the rotatable roller members, at least one of each pair of rotatable roller members with a drive end comprising a gear and supported by one of the platforms of the pair and a removed end for support on the other platform of the pair;
- a first toothed rack supported by the frame, the rack for laying adjacent the drive ends, such that the gears of the drive ends are engaged with the teeth of the rack such that when the roller conveyor moves past the frame it causes the rollers having drive ends to rotate;
- further comprising a forced hot air assembly including a housing for substantially enclosing the roller conveyor assembly and for directing hot air onto the rotatable roller members;
  - wherein the forced hot air assembly includes a hot air handling assembly having a manifold with multiple jets;
  - wherein the forced hot air assembly includes an air inlet for carrying forced hot air into the housing and an exhaust for carrying hot air from the housing;
  - wherein either the inlet or exhaust has a member to control the amount of air moving therethrough; and
- further including a fan and burner for heating air for introduction into the housing;
- further including a motor for driving the axle and sprocket link chains; and
- further including a speed controller for controlling the motor.

* * * * *